United States Patent

[11] 3,615,563

[72] Inventor  Lyman Chalkley
              6626 Tyrian St., La Jolla, Calif. 92057
[21] Appl. No. 792,851
[22] Filed     Jan. 21, 1969
[45] Patented  Oct. 26, 1971

[54] DYE CYANIDES PHOTOACTIVATED BY INORGANIC SALTS
     12 Claims, No Drawings

[52] U.S. Cl. .................................... 96/90, 96/88
[51] Int. Cl. .................................... G03c 1/52
[50] Field of Search .......................... 96/88, 90, 48

[56]              References Cited
              UNITED STATES PATENTS
2,324,060   7/1943   Boughton ................... 96/90 X
3,418,128   12/1968  Huett ....................... 96/90

Primary Examiner—Norman G. Torchin
Assistant Examiner—Won H. Louie, Jr.
Attorney—Bacon & Thomas ABSTRACT: Dye cyanides are photoactivated by salts of metals of groups 1B and 2B of the periodic table of the elements. Systems are disclosed in which a solution of a dye cyanide in a nonphotoactivating solvent are made photoresponsive by the addition of a salt of a metal of group 1B or 2B. Also photographic sheet materials are described in which the incorporation of a salt of a metal of group 1B or 2B prevents the evolution of hydrogen cyanide during and after the photolysis of the dye cyanide sensitizer.

DYE CYANIDES PHOTOACTIVATED BY INORGANIC SALTS

This invention relates to systems in which dye cyanides are rendered photosensitive by combination with metallic salts, and more particularly by salts of the metals of groups 1B and 2B of the periodic system of the elements.

It has long been known that the colorless para amino derivatives of the triarylacetonitriles, referred to as dye cyanides, when combined with suitable organic photoactivators will undergo photolysis to form brilliantly colored dyestuffs. Based on this phenomenon a number of photographic, actinometric, dosimetric and other useful products and processes have been devised. Suitable photoactivators have been disclosed in several U.S. Pat. Nos. such as numbers 2,676,887; 2,829,052; 2,855,303; 2,936,235.

At the same time there are many organic systems in which the dye cyanides are not usefully photosensitive; in fact, Prof. E. O. Holmes, Jr., has indicated that in solvents with dielectric constants below about 4.5 photolysis of the dye cyanides does not take place (*Journal of Physical Chemistry*, volume 61, page 440 (1957)). Yet solvents of lower dielectric constant could, because of their unreactivity, be very useful in the application of dye cyanides to dosimetry of high energy radiation, preparation of homogeneous photographic films of desirable properties, etc.

It has now been found that in solvents that do not render the dye cyanides photosensitive the addition of a salt of a metal in the 1B and 2B groups of the periodic table produces photosensitivity, i.e., the salt acts as a photoactivator for dye cyanides. Thus, for example, Malachite Green cyanide is soluble in diethyl ether but is not appreciably photoactivated to form the dye, Malachite Green on irradiation by ultraviolet. Likewise, many of the film forming materials, such as the cellulose esters and the polymeric methacrylic acid esters dissolve Malachite Green cyanide to form clear films with it, but the films are not substantially photosensitive and yield little Malachite Green dye on irradiation. However, in both liquid solution in diethyl ether and in a cellulose acetate film Malachite Green cyanide is rendered capable of photolysis to the dye by the addition of a salt of a metal of 1B and 2B groups of the periodic table of the elements.

While the preparation of photosensitive systems of this type and their use are not dependent upon a knowledge of the chemical mechanism by which metallic salts photoactivate dye cyanides, a useful hypothesis is provided by the assumption that the salt forms a photosensitive coordination compound with the dye cyanide. The photochemical conversion to dye of a dye cyanide dissolved in a nonphotoactivating solvent has a quantum efficiency of near zero, but the postulated coordination compound of the dye cyanide and salt of a group 1B or 2B metal may have a quantum efficiency of conversion to dye of near 1. This hypothesis is used and developed further to facilitate the presentation of some of the following description, but the practice of the invention is not dependent upon its validity.

A practical advantage of the photoactivation of dye cyanides by metallic salts is that it makes possible the preparation and use of photosensitive films from some of the most widely used and desirable film formers, such as cellulose acetate, cellulose butyrate, cellulose butyrate acetate and the polymerized methacrylic esters. Heretofore dye cyanide sensitized films in these materials have had to be photoactivated by the addition of substantial proportions of plasticizers that were themselves photoactivators for the dye cyanides. The inclusion of photoactivating plasticizers has reduced the hardness and increased the tackiness of the resulting films. The metallic salt photoactivators do not have these undesirable effects.

Another advantage of the salt activation of dye cyanides is that it may be used to increase the quantum yield in solvents that, while themselves photoactivators, do not provide systems with high quantum yields. One such solvent is water, in which A. H. Sporer found that the quantum yield of dye from tri-beta-hydroxyethyl-p-rosaniline cyanide was 0.25 while the quantum yield from the same photolysis in ethyl alcohol was 0.98. ("Transactions of the Faraday Society," volume 57, page 938(1961))

It has now been found that the quantum yield in water may be increased by the addition of a salt of a group 1B or 2B metal. For this use salts that are stable in the solvent employed are preferable to salts that are decomposed by the solvent. Thus, for example, zinc chloride, which is suitable for use in ether is less effective in aqueous solution, in which it is hydrolyzed with precipitation of the zinc. In aqueous systems and systems exposed to moist air the more stable mercuric chloride and cupric salts are preferable.

The systems containing metallic salt photoactivators have the advantage over many of the organic photoactivated systems that the reversal of photolysis and bleaching in the dark that normally occur in the dye cyanide photosensitive systems are usually prevented by the metallic salt alone without need for the addition of the organic acid disclosed in U.S. Pat. No. 2,441,561. Accompanying the photolysis there appears to be a reaction in which a metallic cyanide is formed along with the dye salt of the anion introduced with the photo activating salt. The cyanides of the metals of groups 1B and 2B do not normally react with dyes to form dye cyanides or to cause bleaching of the dye.

A major advantage of the systems and processes using salt photoactivation of dye cyanides appears in sensitized paper and films. Heretofore, air dry dye cyanide sensitized paper and film has liberated gaseous hydrogen cyanide as a result of printing by ultraviolet radiation. The quantity is very small and insignificant under most conditions. However, if large amounts of dye cyanide sensitized reproduction paper were continuously printed in cramped, unventilated work areas the suppression of hydrogen cyanide evolution could become of practical importance. The addition to dye cyanide sensitized paper or film of salts of metals of groups 1B and 2B can prevent the evolution of hydrogen cyanide during and after printing of the sensitized materials. This property appears to be unique to the 1B and 2B families of the elements. There are, of course, many metallic ions that react with cyanide ion in solution to remove the cyanide ion by precipitation of an insoluble cyanide or formation of an un-ionized salt. Examples are nickelous and cobaltous salts. However, in air dry dye cyanide sensitized paper and films this reaction with nickelous and cobaltous salts is extremely inefficient. Apparently the presence of a solvent is necessary for removal of cyanide ion by salts of this type. On the other hand, suitable salts of the 1B and 2B groups of metals when added to dye cyanide sensitized papers and films are highly effective in trapping hydrogen cyanide that would otherwise be produced during printing. They will completely suppress hydrogen cyanide evolution whether other, e.g., organic, photoactivators are present or not. In terms of the photosensitive salt complex hypothesis presented above, when photolysis of the coordination compound of dye cyanide and ion of a group 1B or 2B metal takes place the liberated cyanide ion reacts with the metallic ion without leaving the complex molecule. It therefore is held without need for a solvent to facilitate the intermolecular reaction that would otherwise be required for the combination of a metal ion with the photochemically formed cyanide ion.

The essential constituents of a metallic salt photoactivated system are the dye cyanide and a salt of a metal of the 1B or 2B groups of the periodic system. Solvents and other photoactivators also may be present. The effectiveness of photoactivation depends on the molecular ratios and concentrations of the dye cyanide and metallic salt; and, of course, on the inherent stability of the complex formed between the dye cyanide and metallic salt. For greatest effectiveness the salt should be present in sufficient concentration to provide the stoichiometric amount for the formation of the complex compound with the dye cyanide, and the concentrations of both should be great enough to convert most of the dye cyanide into its complex salt. However, for the measurement of large does of radiation it is often useful to employ a system that does not produce the maximum possible quantum yield. In these cases lower ratios of metallic salt to dye cyanide and lower concentrations of one or both constituents may be advantageous. Thus concentration of both dye cyanide and metallic salt photoactivator may be varied over wide ranges to obtain desired degrees of photoactivation.

Examples of suitable metallic photoactivating salts are zinc acetate, zinc chloride, cadmium chloride, cupric acetate, cupric chloride, silver nitrate and mercuric chloride. Other anions may be employed. The anion is usually chosen to give a salt that is soluble and stable in the solvent. When the salt is used in water or in system that is to be exposed to moist air it should be chosen so as not to be decomposed by hydrolysis. If the primary purpose is to trap and hold hydrogen cyanide the salt should not give so acid a reaction as to decompose the cyanide of the metal. For example, to trap cyanide in a system that may be exposed to moisture cupric acetate is usually preferable to cupric chloride.

The salt activated system and process may be used with both hydrophilic and hydrophobic dye cyanides. Examples of suitable dye cyanides are: Malachite Green cyanide, Brilliant Green cyanide, p-Rosaniline cyanide, tri-hydroxyethyl-p-Rosaniline cyanide, hexa-hydroxyethyl-p-Rosaniline cyanide, sulfonated dye cyanides, dye cyanides containing quaternary ammonium groups.

The practice of the invention will be made clearer by the following examples, which are presented as illustrative of, but not limiting, the invention.

EXAMPLES 1 to 8

Photoactivation by Zinc Chloride

Malachite Green cyanide is dissolved in ethyl ether that has been shaken with 50 percent aqueous sodium hydroxide to remove peroxides and distilled. Granular zinc chloride containing 90 to 95 percent of anhydrous zinc chloride is dissolved in ether prepared in the same way. The two solutions are mixed to give the concentrations specified below. For illustration, the detailed preparation of the reaction solution in example 2, below, is to dissolve 35.5 mg. of Malachite Green cyanide in freshly distilled ether and make up to 500 ml. and mix this with a solution of 110 mg. of 95 percent zinc chloride in 500 ml. of ether to obtain 1 liter of solution 1 $P10^{14}$ molar in Malachite Green cyanide and 7.7$P10^{14}$ molar in zinc chloride.

It is to be noted that the reaction solutions are not strictly anhydrous and are not intended to be. Intensively dried solutions give lower quantum yields.

Quantum yields are determined by exposure of the reaction solution to a measured amount of radiation of 2537 A wavelength and determination of the quantity of Malachite Green dye that is formed. Examples 1 to 5, incl., show the quantum yields of Malachite Green produced by the photolysis of 1$P10^{14}$ molar Malachite Green cyanide in ether with the specified concentration of zinc chloride:

| Example | Zinc chloride concentration | Quantum yield |
|---|---|---|
| 1 | 0 | less than 0.0003 |
| 2 | 7.7×10¹Molar | 0.002 |
| 3 | 1.2×10¹Molar | 0.03 |
| 4 | 5.0×10¹Molar | 0.1 |
| 5 | 8.6×10¹Molar | 0.2 |

With a constant zinc chloride concentration of 3.4$P10^{12}$ molar and varying concentrations of Malachite Green cyanide the quantum yields of dye are:

| Example | Malachite Green cyanide concentration | Quantum Yield |
|---|---|---|
| 6 | 5×10¹⁴ Molar | 0.06 |
| 7 | 1×10¹⁴ Molar | 0.07 |
| 8 | 2×10¹⁴ Molar | 0.08 |

In the determination of quantum yields more than 90 percent of the incident 2537 A radiation was absorbed by the test solution.

The hypothesis that photolysis takes place in a photosensitive coordination compound of dye cyanide and metallic salt provides a basis for analysis of the above results if it is assumed that the quantum yield of the coordination compound is 1, and that the coordination compound contains a ratio of 1 molecule of Malachite Green cyanide to 1 molecule of zinc chloride. The instability constant of the coordination compound, then, may be calculated from, $$kx(A-pA)(B-pA)/pA,$$

where $K$ is the instability constant, $A$ is the molar concentration of Malachite Green cyanide, both free and combined, and $B$ is the molar concentration of zinc chloride, both free and combined, and $p$ is the quantum yield of Malachite Green.

From the results given in examples 1 through 8 the instability constant of the hypothetical complex salt would be 0.4. It should be noted, however, that in the method used for derivation of the constant there is implicit assumption both the free Malachite Green cyanide and that combined with zinc chloride, i.e., the complex salt, have approximately the same molecular extinction coefficient for 2,537 A. If the extinction coefficients differed a correspondingly different proportionality factor would be used to relate the ratio of radiation absorbed by the free dye cyanide to that absorbed by the complex salt. However, the absolute value of the extinction coefficients and their ratio need not be known to use the above relationship to calculate the quantum yields to be expected in solutions containing other concentrations of Malachite Green cyanide and zinc chloride. Therefore, the examples given here indicate a method for the calculation of the composition of a solution to give any desired quantum yield within the range afforded by the solubilities of the constituents.

EXAMPLE 9

An etherial solution is made up 1$P1014$ molar in Malachite Green cyanide and 9.3$P1014$ molar in mercuric chloride. On irradiation by 2537 A. this solution gives a quantum yield of Malachite Green of 0.01. Comparison with examples 2 to 8 will show that in terms of the photosensitive complex salt hypothesis the mercuric chloride double salt of Malachite Green cyanide is considerably more stable than the zinc chloride complex salt.

EXAMPLE 10

Solutions with variable quantum yields of dye are prepared by the substitution of silver nitrate for the zinc chloride in examples 2–8.

EXAMPLE 11

Solutions with variable quantum yields of dye are prepared by the substitution of cupric chloride for the zinc chloride in examples 2–8.

EXAMPLE 12

A 1$P10^{14}$ molar aqueous solution of Ethyl Green cyanide (prepared as the quaternary ammonium chloride) adjusted to pH 3.8 with hydrochloric acid has a quantum yield of dye on irradiation with 2537 A of 0.18.

The same concentration of Ethyl Green cyanide in aqueous solution of the same pH but 0.1 molar in cadmium chloride has a quantum yield of 0.17, showing an increase in the photoactivating power of water on addition of photoactivating salt.

EXAMPLE 13

Filter paper is wet with a solution of 1.5 g. of N, N', N''-Hexa(beta-hydroxyethyl)-p-Rosaniline cyanide in 1 liter of a mixture of equal volumes of water and ethylene glycol monomethyl ether, and dried in the air to give a sensitized paper with a concentration of 150 mg. of dye cyanide per square meter. On irradiation by ultraviolet of 3000 A wavelength a violet color is formed and the atmosphere immediately adjacent to the irradiated paper gives a positive test for hydrogen cyanide.

A sensitizing solution is made up as above but with the addition of 3 g. of cupric acetate. Filter paper is wet with this and dried. Irradiation of the dried paper produces a violet image but the atmosphere immediately adjacent to the printed paper gives no test for hydrogen cyanide. Hydrogen cyanide evolution has been suppressed by the presence of the cupric acetate.

The test used for detection of the evolution of hydrogen cyanide during irradiation of sensitized paper is as follows:- The sensitized sheet material sample is cut into a square 2½ inches on a side and placed with the photosensitive side up in the inner dish of a borosilicate Petri dish pair. A convenient size for the Petri dish is that commercially designated as 100 mm., the nominal outside diameter of the larger dish. To the center of the inside of the larger dish is cemented a one-half inch square of aluminum foil and within the borders of this a (¼) ×(three/eighths) inch strip of filter paper. Just before use the filter paper is moistened by a drop of the cupric acetate—benzidine acetate reagent given in Fritz Feigl, "Spot Tests" first edition, pp. 167–8 (Nordemann Publishing Co., New York, 1937) for the detection of hydrogen cyanide. The benzidine acetate solution used in this reagent must be free of excess acetic acid. The smaller of the Petri dish pair is covered by placing the larger dish of the pair upon it in the normal manner. The dish then contains on the bottom the sensitized sample, sensitive side up, and over it the hydrogen cyanide test paper suspended from the cover. A 15 watt fluorescent sunlamp is suspended 2 inches above the closed dish and the sample irradiated for 5 minutes. The larger cover dish is then removed and the spot test paper examined. If no hydrogen cyanide is evolved during the irradiation the test paper will remain colorless, while if hydrogen cyanide is evolved the test paper will become colored blue or gray.

If in the sensitized paper specified in this example the cupric acetate is replaced by the same weight of plumbous acetate, cobaltous acetate, cobaltous nitrate, nickelous acetate or nickelous chloride the evolution of hydrogen cyanide on irradiation of the sensitized paper is not prevented, as is shown by the formation of a blue color on the benzidine acetate spot test paper in the test for hydrogen cyanide.

EXAMPLE 14

A sensitizing solution is made of 1.5 g. of N, N', N''-Hexa(beta-hydroxyethyl)-p-Rosaniline cyanide and 1.5 g. of cupric acetate in 1 liter of 50 percent aqueous ethylene glycol monomethyl ether. Filter paper is wet with this solution and dried in the air. On photolysis by ultraviolet hydrogen cyanide is not released into the atmosphere.

EXAMPLE 15

A sensitizing solution is made of 1.5 g. of N, N'N''-hexa(beta-hydroxyethyl)-p-Rosaniline cyanide and 3 g. of mercuric chloride in 1 liter of 50 percent aqueous ethylene glycol monomethyl ether. Filter paper is wet with this and dried in the air. On irradiation by ultraviolet the dye cyanide is photolyzed to the parent blue dye but hydrogen cyanide is not released into the atmosphere.

EXAMPLE 16

A sensitizing solution is made of 1.5 g. of N, N', N''-hexa(beta-hydroxyethyl)-p-Rosaniline cyanide and 3 g. of silver nitrate in 1 liter of 50 percent aqueous ethylene glycol monomethyl ether. Filter paper is wet with this and dried in the air. On irradiation by ultraviolet the dye cyanide is photolyzed to the parent blue dye but hydrogen cyanide is not released into the atmosphere. This sensitized paper has a short shelf life because of darkening due to the gradual reduction of silver nitrate by the cellulose.

In examples 13 to 16, inclusive, it should be noted that the filter paper is itself a photoactivator for the hydrophilic dye cyanide employed. The metallic salts are additional photoactivators and perform their hydrogen cyanide trapping function without interference by the other photoactivator (cellulose) that is present.

I claim:

1. A photosensitive composition comprising the combination of a colorless cyanide of a triarylmethane dye and a metallic salt wherein the metal is selected from the groups consisting of 1B and 2B of the periodic system of the elements.

2. The photosensitive composition of claim 1 wherein the metal is selected from the group consisting of copper, silver, zinc, cadmium and mercury.

3. A photosensitive element comprising a supporting sheet coated with the composition of claim 1.

4. The photosensitive element of claim 3 wherein the metal is selected from the group consisting of copper, silver, zinc, cadmium and mercury.

5. The photosensitive element of claim 4 wherein the metallic salt is the cupric salt of a carboxylic acid.

6. The photosensitive element of claim 5 wherein the metallic salt is cupric acetate.

7. A photosensitive solution comprising the photosensitive composition of claim 1 dissolved in a common solvent for the metallic salt and dye cyanide.

8. The photosensitive solution of claim 7 wherein the common solvent is a polymeric film forming material.

9. The photosensitive solution of claim 7 wherein the common solvent is selected from the group consisting of cellulose acetate, cellulose butyrate, cellulose butyrate acetate and polymerized methacrylic ester.

10. A photochemical process comprising the irradiation of the composition of claim 1 with ultraviolet radiation until a visible color is formed.

11. A photochemical process comprising the irradiation of the composition of claim 3 with ultraviolet radiation until a visible color is formed.

12. A photochemical process comprising the irradiation of the composition of claim 7 with ultraviolet radiation until a visible color is formed.

* * * * *